(12) United States Patent
Takushima

(10) Patent No.: US 8,676,594 B2
(45) Date of Patent: *Mar. 18, 2014

(54) INFORMATION PROVIDING APPARATUS AND INFORMATION PROVIDING METHOD

(75) Inventor: Yoshio Takushima, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 246 days.

This patent is subject to a terminal disclaimer.

(21) Appl. No.: 13/108,125

(22) Filed: May 16, 2011

(65) Prior Publication Data

US 2011/0302104 A1 Dec. 8, 2011

(30) Foreign Application Priority Data

Jun. 8, 2010 (JP) ................................. 2010-131154

(51) Int. Cl.
  G06Q 30/02 (2012.01)
  G06Q 10/10 (2012.01)
  G06Q 10/06 (2012.01)
  G06Q 30/06 (2012.01)
  G06Q 10/08 (2012.01)

(52) U.S. Cl.
  USPC ........................................................ 705/1.1

(58) Field of Classification Search
  None
  See application file for complete search history.

(56) References Cited

U.S. PATENT DOCUMENTS

2011/0093329 A1* 4/2011 Bodor et al. ............... 705/14.42

FOREIGN PATENT DOCUMENTS

JP 2008-289043 11/2008
WO 2009/088919 7/2009

OTHER PUBLICATIONS

Chinese First Office Action dated Aug. 7, 2012, from corresponding Chinese Application No. 201110148677.6.
Notification of Reason(s) for Refusal dated Jan. 24, 2012, from corresponding Japanese Application No. 2010-131154.
Yuta Ohara. "iPod Entertainment Newspaper" vol. 12, iPod/iPhone Q&A, Mac People, ASCII Media Works Inc., Oct. 1, 2009, vol. 15, No. 10, Oct. 1, 2009, pp. 162-163.
Chinese Second Office Action dated Mar. 5, 2013, from corresponding Chinese Application No. 201110148677.6.

* cited by examiner

Primary Examiner — Jonathan Ouellette
(74) Attorney, Agent, or Firm — Katten Muchin Rosenman LLP

(57) ABSTRACT

A rating server is provided with: a rating acquisition unit configured to acquire, from a user who purchased content sold in a plurality of types of sales modes, a rating for the content; a rating collection unit configured to determine, by collecting the rating given by a user on the content having the same title, the degree of the rating for the content based on a title regardless of a difference or a similarity in a sales mode of the content purchased by the user; and a rating information providing unit configured to provide, to an external apparatus, the degree of the rating for the content based on the title as a result of the rating for the content by the user.

5 Claims, 11 Drawing Sheets

INFORMATION PROVIDING SYSTEM 10

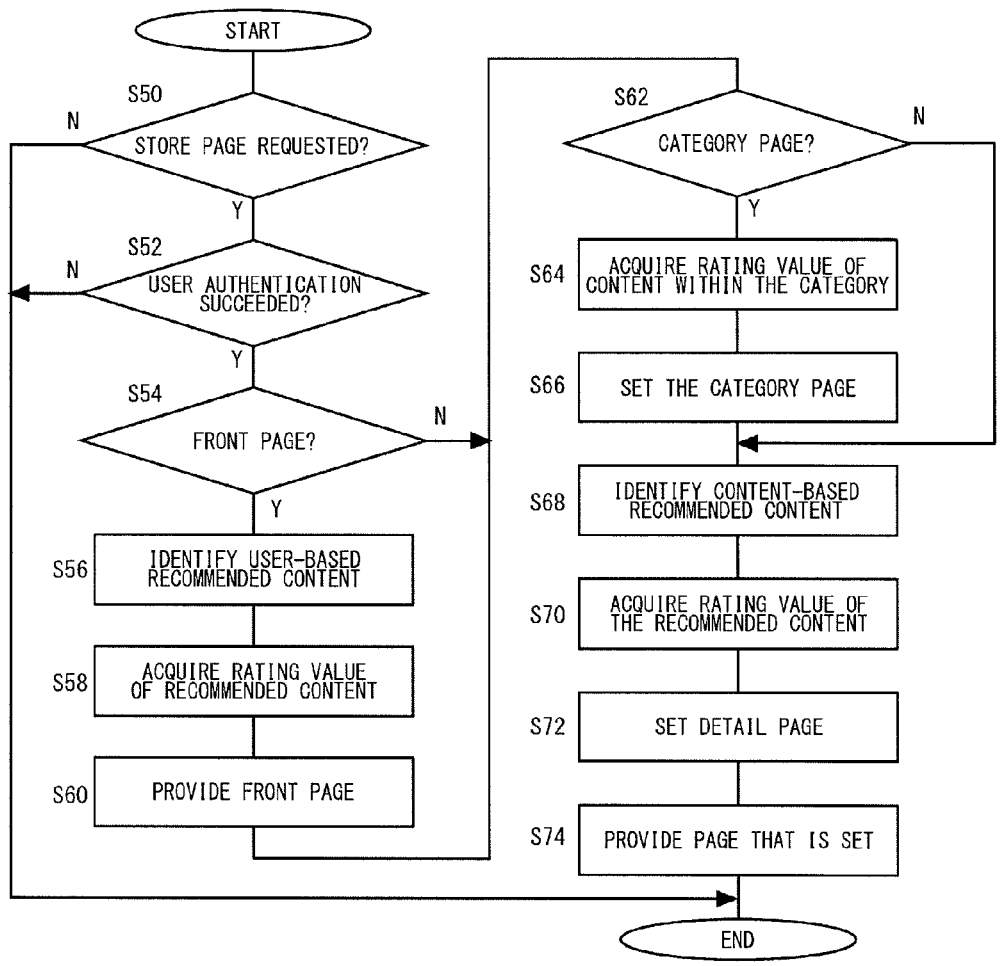

INFORMATION PROVIDING APPARATUS AND INFORMATION PROVIDING METHOD

BACKGROUND OF THE INVENTION

1. Field of the Invention

The present invention relates to data processing techniques and particularly to techniques for providing, to the outside, information related to content such as games, etc.

2. Description of the Related Art

Today, ratings on content by users are often presented as information of the content for sale in various online sites, for example, online shopping sites, etc.

Content having the same title can be sold in several different types of sales modes such as a rental mode and a sellout mode. The inventors of the present invention consider that no specific method has been fully suggested for properly determining the degree of the rating for the content by a user in a case where the user purchases the content, which is sold in several different types of sales modes, in any one of the modes.

SUMMARY OF THE INVENTION

In this background, a main purpose of the present invention is to provide a technique for properly determining the degree of a rating given by a user on content, which is sold in several different types of sales modes.

An information providing apparatus according to one embodiment of the present invention comprises: a rating acquisition unit configured to acquire, from a user who purchased content sold through a plurality of types of sales modes, a rating for the content; a rating collection unit configured to determine, by collecting a rating given by a user for the content having an identical title, the degree of the rating for the content based on a title regardless of a difference or a similarity in the types of sales modes of the content purchased by the user; and a rating information providing unit configured to provide, to an external apparatus, the degree of the rating for the content based on the title as a result of the rating for the content by the user.

Another embodiment of the present invention relates to an information providing method. This method is an information providing method performed by an information providing apparatus and comprises: acquiring, from a user who purchased content sold through a plurality of types of sales modes, a rating for the content; determining, by collecting the rating given by a user for the content having an identical title, the degree of the rating for the content based on the title regardless of a difference or a similarity in the types of sales modes of the content purchased by the user; and providing, to an external apparatus, the degree of the rating for the content based on the title as a result of the rating for the content by the user.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 14 is a flowchart illustrating the operation of the store server.

DETAILED DESCRIPTION OF THE INVENTION

The invention will now be described by reference to the preferred embodiments. This does not intend to limit the scope of the present invention, but to exemplify the invention.

Figure 1:
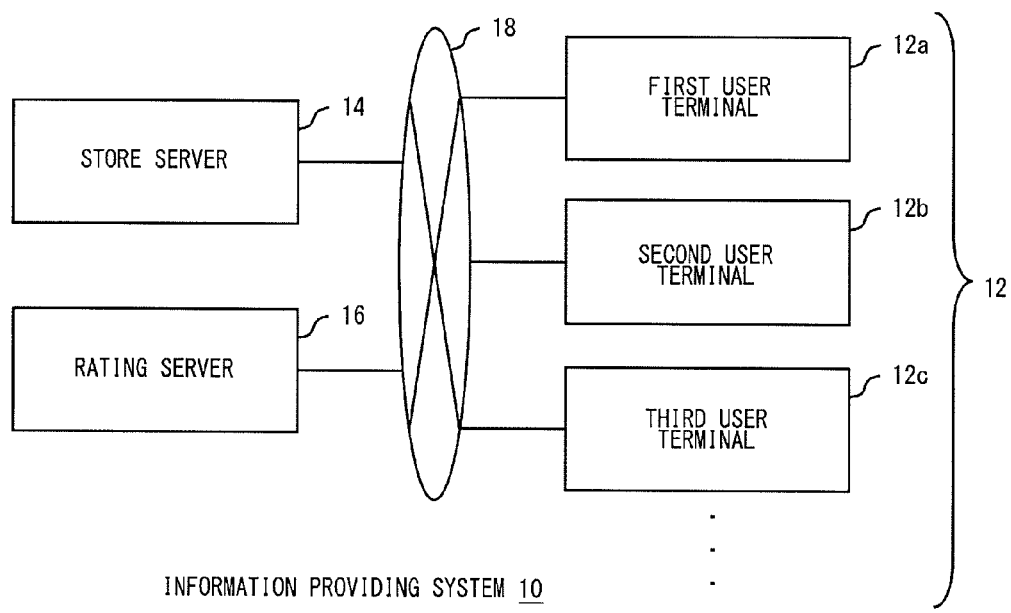
FIG. 1 is a diagram illustrating the configuration of an information providing system according to an embodiment of the present invention.

FIG. 1 illustrates the configuration of an information providing system according to an embodiment of the present invention. An information providing system 10 is provided with: a first user terminal 12a, a second user terminal 12b, a third user terminal 12c, . . . , which are all generically referred to as a user terminal 12; a store server 14; and a rating server 16. The apparatuses shown in FIG. 1 are connected to one another via a communication network 18 including a publicly-known communication means such as LAN, WAN, Internet, etc.

The user terminal 12 is an information processing terminal to be operated by a user. The user terminal 12 of the embodiment is assumed to be a game console that reproduces electronic content in accordance with the operation by a user; however, the user terminal 12 may be a portable game device or a common PC. The user terminal 12 accesses a virtual store site (hereinafter, also referred to as a "store site"), which is an online site provided by the store server 14 via the communication network 18, that introduces the content to the user for sales. The user terminal 12 displays screen information of the store site (hereinafter, also referred to as a "store page") on a predetermined display. A user who has accessed the store site is also described particularly as an "access user" in the following. Note that the "content" in the embodiment includes various types of content for sale in an online shopping site such as game applications, music content, video-image content, magazines, comics, etc.

The store server 14 is a server that provides a store page to the user terminal 12 upon receiving the access to the store site from the user terminal 12. The rating server 16 is a server that collects user's rating for various types of content and then provides the result of the collection to the store server 14 as a degree of rating by the user on the respective content.

Figure 2:
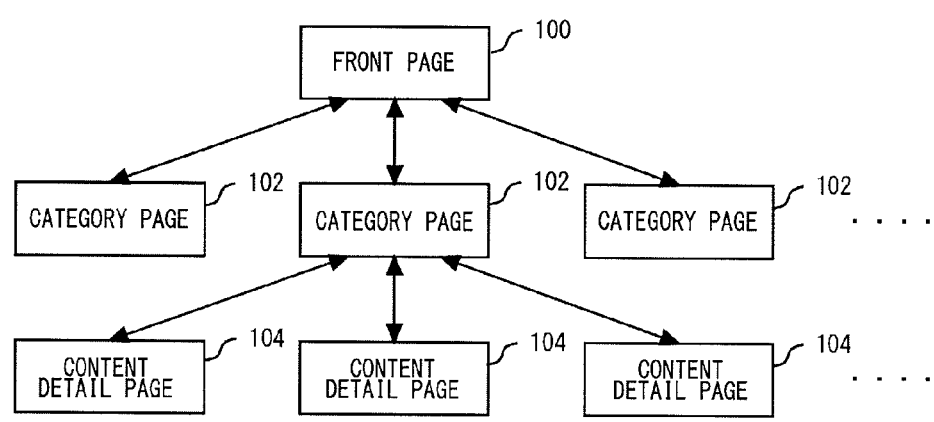
FIG. 2 is a diagram illustrating an embodiment of screen transition of a store site.

FIG. 2 illustrates an embodiment of screen transition of a store site provided by the store server 14. A store page includes a front page 100, which is a screen of the top-level hierarchy, a category page 102, which is a screen of the middle-level hierarchy, and a content detail page 104, which is a screen of the lowest-level hierarchy. The front page 100 displays the information of a plurality of types of categories or recommended content for a user as an entrance into the store site. The category page 102 displays, in an aggregated manner, the information of a plurality of pieces of content that belong to the same category. The content detail page 104 displays the detailed information of a piece of content or the information of another piece of content that is related to the content. FIG. 2 shows the screen transition on three hierarchical levels. However, the screen transition may be further hierarchized, for example, by dividing the category page 102 into a category page for a large classification and a category page for a small classification.

When an entry button (a ○ button in the present embodiment) is pressed on the store site, the screen transitions from a page on the upper level in the hierarchy to a page on the lower level in the hierarchy. For example, the screen sequentially transitions from the front page 100 to the category page 102 to the content detail page 104. When the content is directly selected on the front page 100, the screen transitions from the front page 100 to the content detail page 104. When another piece of content is selected on the content detail page 104, the screen transitions from the content detail page 104 to a content detail page 104 of said another piece of content. On the other hand, when a cancel button (a x button in the present embodiment) is pressed through the user terminal 12, the screen transitions from a page on the lower level in the hierarchy to a page on the upper level in the hierarchy. For example, the screen sequentially transitions from the content detail page 104 to the category page 102 to the front page 100.

Figure 3:
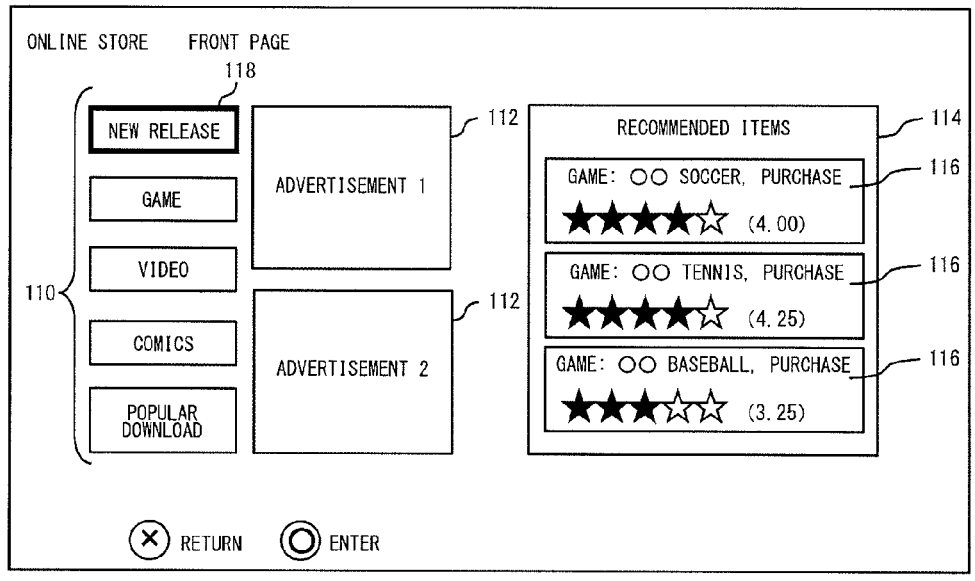
FIG. 3 is a diagram illustrating a display example of a front page shown in FIG. 2.

FIG. 3 illustrates a display example of the front page 100 shown in FIG. 2. A category icon 110 shows content categories. An advertisement area 112 is a display area of an advertising image for the content. A recommendation information area 114 is a display area for recommended content of a plurality of types of categories, which are determined based on the attribute of an access user, and includes a plurality of recommendation information fields 116. The recommendation information field 116 displays a thumbnail image, a title, a type of sales mode, a type of a reproduction detail, and a degree of rating by the user of the content.

The type of sales mode indicates, for example, a rental mode (license agreement will be valid for a certain term) or a purchase mode (license agreement will be valid in perpetuity). The "purchase" mode can be also said to be a "sellout" mode from the seller's standpoint. Other types of sales modes include, for example, a download sales mode, a streaming delivery mode, and a shipping mode by mail or the like. The type of the reproduction detail indicates, for example, whether it is a three-dimensional image or two-dimensional image, a SD image or HD image, a special (premium) edition or normal (reprint) edition. The type of the reproduction detail can be said to be the type of the media in which the content is stored and can be also said to be the form of expression of the content. The degree of rating by the user indicates a rating value by the user on a scale of one to five.

On the front page 100, the user moves a cursor 118 by using a direction key and selects any one of the category icons 110, any one of the advertisement areas 112, or any one of the recommendation information fields 116 so as to press the ○ button. When a category icon 110 is selected, the screen transitions to the category page 102 of the selected category. When an advertisement area 112 or a recommendation information field 116 is selected, the screen transitions to the content detail page 104 of the selected content.

Figure 4:
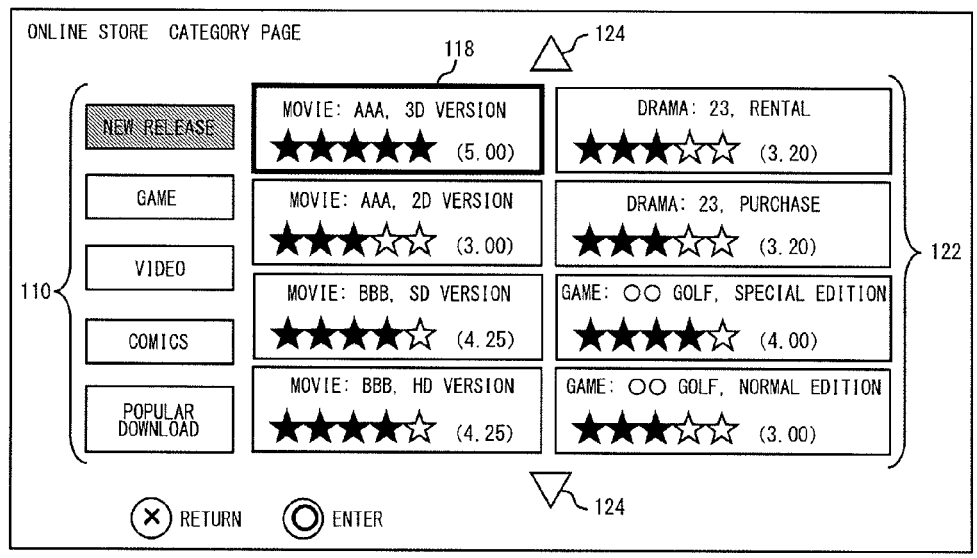
FIG. 4 is a diagram illustrating a display example of a category page shown in FIG. 2.

FIG. 4 illustrates a display example of the category page 102 shown in FIG. 2. The category page 102 includes a plurality of content fields 122. FIG. 4 shows the category page 102 of a "new release" category, and the content fields 122 that correspond to respective pieces of newly released content. The display detail of the content fields 122 is the same as the display content of the above recommendation information fields 116.

On the category page 102, the user can display a content field 122 related to other content that belong to the same category by selecting a scroll icon 124. When the ○ button is pressed while any one of the content fields 122 is being selected with use of the cursor 118, the screen transitions to the content detail page 104.

Figure 5:
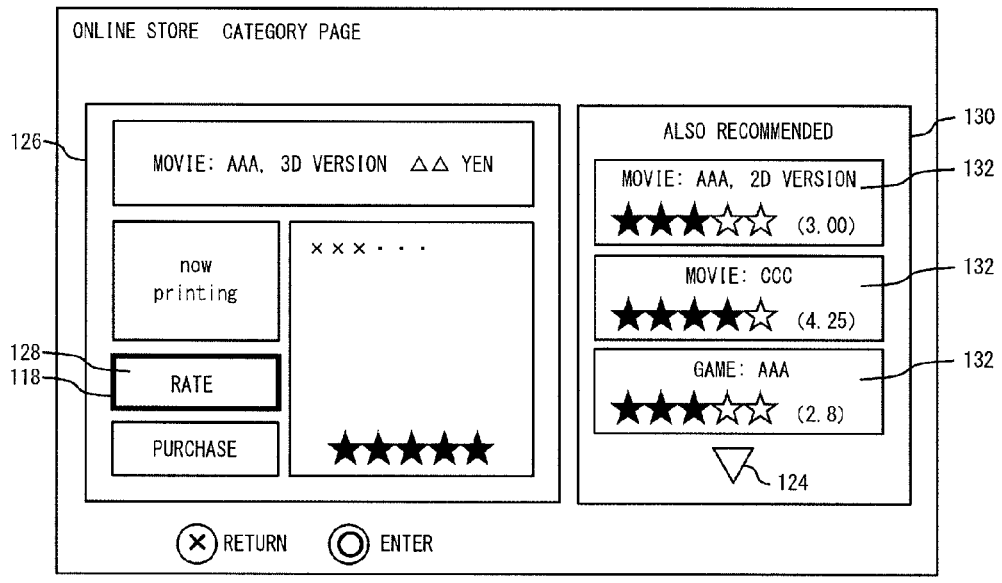
FIG. 5 is a diagram illustrating a display example of a content detail page shown in FIG. 2.

FIG. 5 illustrates a display example of the content detail page 104 shown in FIG. 2. The content detail page 104 includes a detail information area 126 and a recommendation information area 130. The detail information area 126 displays the thumbnail image, the title, the price, the detail information, the degree of rating by the user, a purchase icon, and a rating icon 128 of the content (hereinafter, also referred to as "detail display content") whose detail information is to be displayed. The recommendation information area 130 is a display area for recommended content of a plurality of types of categories, which are determined based on the attribute of the detail display content, and includes a plurality of recommendation information fields 132. The display detail of the recommendation information fields 132 is the same as the display detail of the above recommendation information fields 116.

When the ○ button is pressed by the user while a recommendation information field 132 is being selected on the content detail page 104 with use of the cursor 118, the screen transitions to the content detail page 104 of the selected content. When the ○ button is pressed while the rating icon 128 is being selected with use of the cursor 118, an entry screen for rating information regarding the detail display content.

Figure 6:
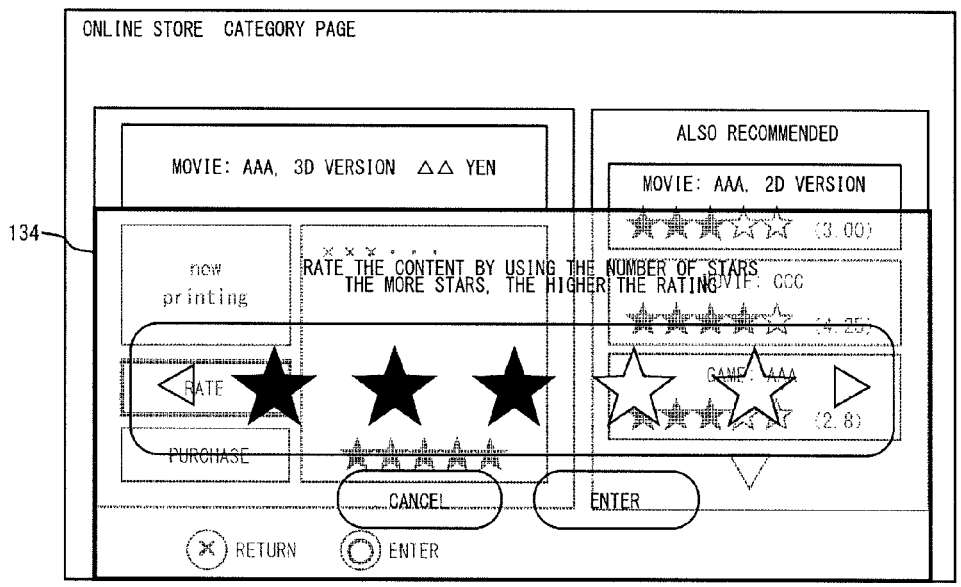
FIG. 6 is a diagram illustrating an example of an entry screen for rating information.

FIG. 6 illustrates an example of the entry screen for the rating information. A rating entry screen 134 is displayed being overlapped on the content detail page 104. The transmittance of the rating entry screen 134 of the present embodiment is set to be a predetermined value and the rating entry screen 134 is translucently displayed. When the user inputs a rating value (sets the number of stars) in the rating entry screen 134 and then selects Enter, the rating value is transmitted to a rating server 16.

A description is hereinbelow given of the configuration of each apparatus shown in FIG. 1.

Figure 7:
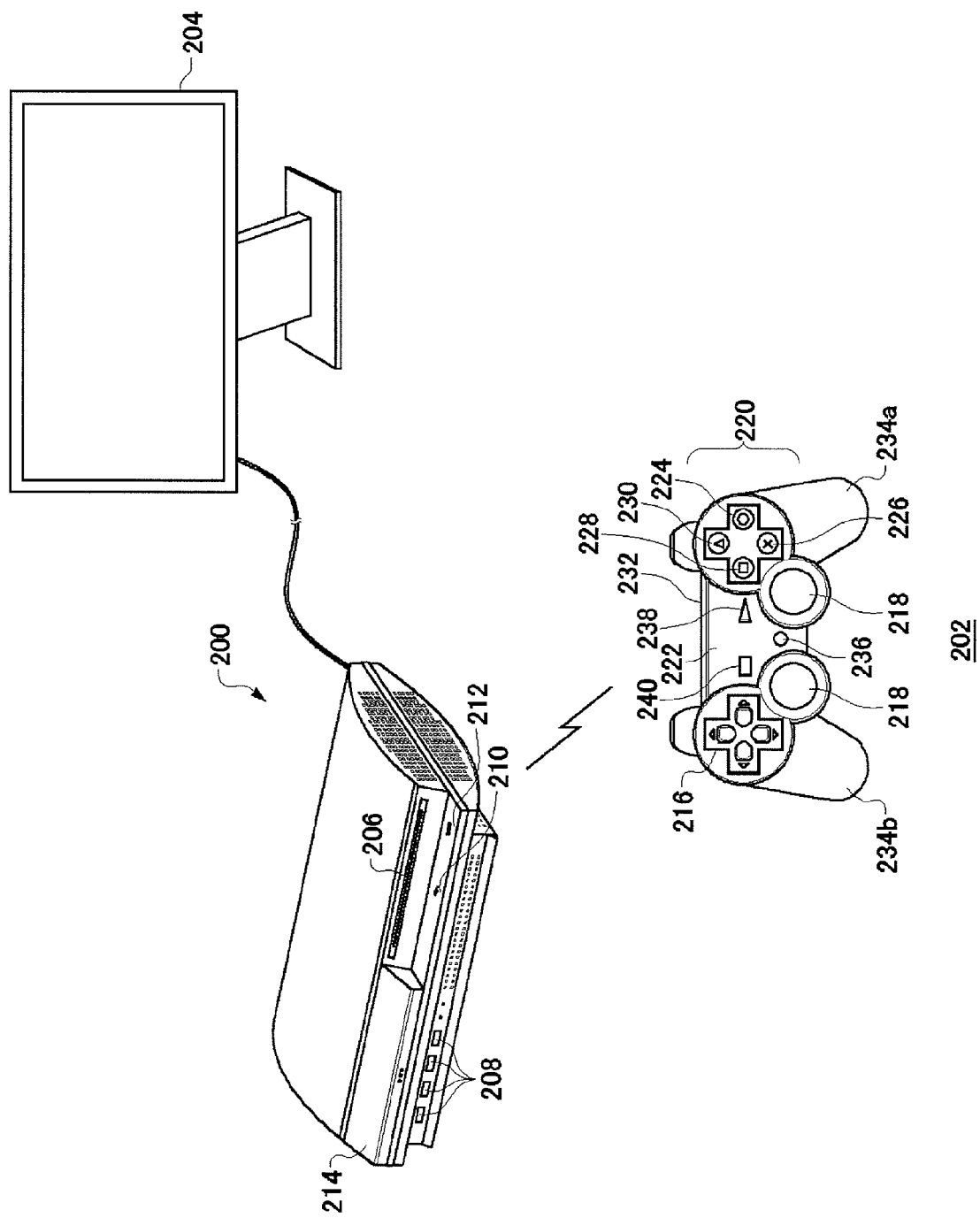
FIG. 7 is a diagram illustrating the exterior configuration of a user terminal shown in FIG. 1.
Figure 8:
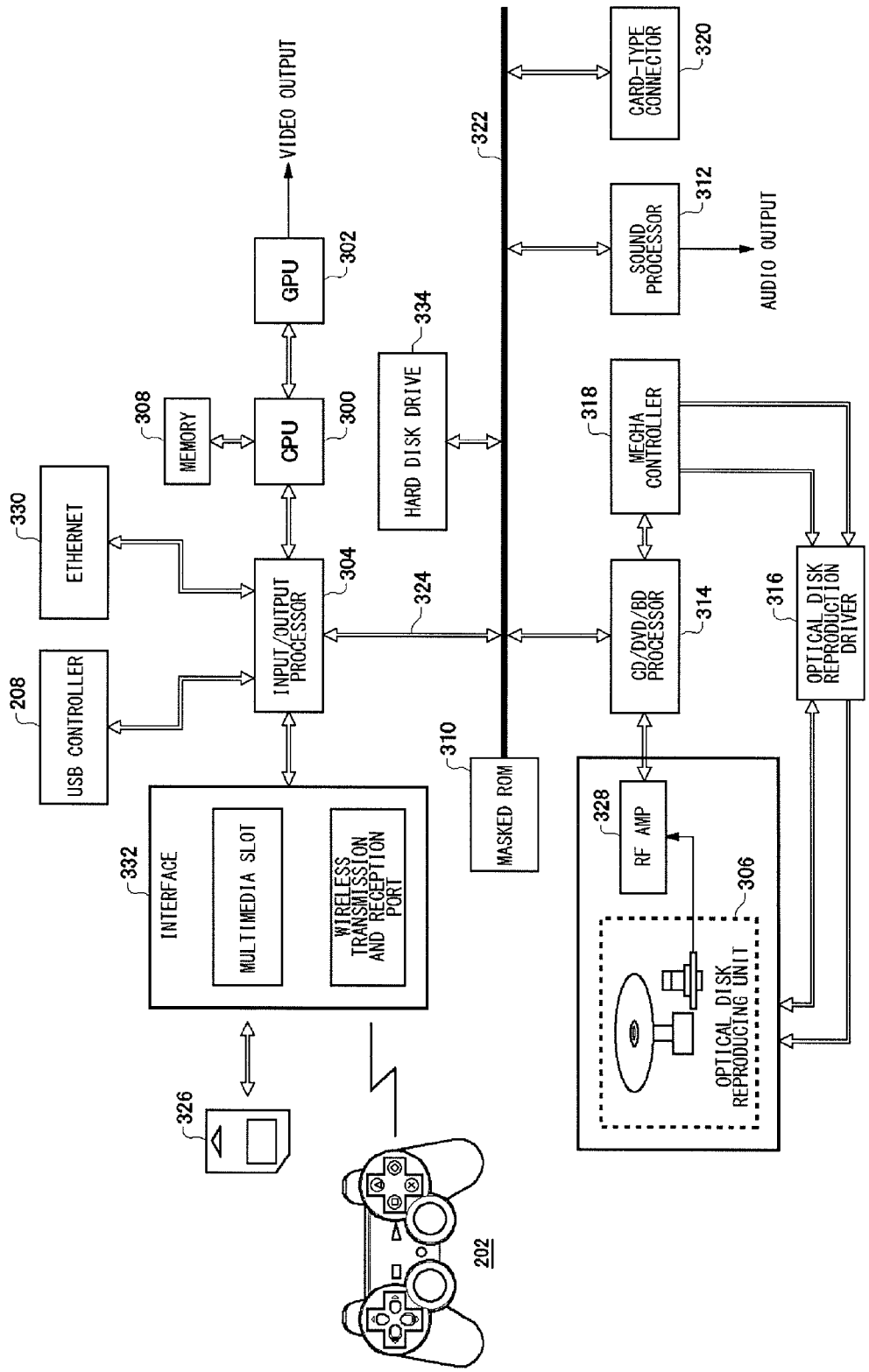
FIG. 8 is a diagram illustrating the configuration of the internal circuit of a game device shown in FIG. 7.

FIG. 7 illustrates the exterior configuration of a user terminal 12 shown in FIG. 1. The figure shows a game console 200 as an example of the user terminal 12. The game console 200 is connected to a controller 202 and a television monitor 204. The game console 200 has functions of, for example, executing various types of games, composing and editing emails, browsing Web pages, and playing movies or music. The controller 202 is wirelessly connected to the game console 200. The television monitor 204 is connected to the game console 200 and outputs sounds in addition to displaying game content, a Web page, a movie, etc.

[Overview of the Game Console]

The game console 200 is provided with a disk insertion slot 206 for an optical disk having a diameter of 12 cm, a USB connecting terminal 208, etc. The disk insertion slot 206 is configured so as to be able to load an optical disk such as a BD (Blu-ray Disk, trademark or registered trademark), and a DVD-ROM, a CD-ROM. A touch sensor 210 is a sensor for removing a disk, and a touch sensor 212 is a sensor for turning on/off the power. Although the illustration is omitted, a power switch, an audio-visual output terminal, an optical digital output terminal, an AC power input terminal, a LAN port, an HDMI terminal, and the like are provided on the back of the game console 200. In addition, the game console 200 may have an IEEE1394 terminal so as to be able to communicate via IEEE1394.

The game console 200 is also provided with a multimedia slot. A multimedia slot case 214 is a cover member and, although the illustration is omitted, is configured so that the multimedia slot is exposed when the multimedia slot case 214 is open.

The game console 200 performs various types of processes for, for example, executing a game, composing, editing, and receiving an email, and browsing a Web page in accordance with an application program for a game, an email, or a Web browser and with an instruction from the user via the controller 202. The application program may be any application program that is loaded from various types of recording media such as an optical disk (e.g., a CD-ROM, a DVD-ROM, and a BD), a hard disk drive, or semiconductor memory, or that is downloaded via various types of transmission media such as a LAN and a CATV circuit.

In addition to executing a game, composing, editing, receiving an email, browsing a Web page, etc., which are based on application programs, the game console 200 can reproduce (or decode), for example, video and audio data such as audio data recorded in a CD and a movie recorded in a DVD or a BD. The game console 200 can also operate based on other various types of application programs. A driver program for reproducing a DVD or a BD is recorded in, for example, a hard disk drive 334 built in the game console 200.

[Overview of the Controller]

The controller 202 is activated by a battery (not shown) and is provided with a plurality of buttons and keys for entering operation input to progress a game, etc. When the user operates the button or the key of the controller 202, the operation input is transmitted to the game console 200 wirelessly or by wires.

The controller 202 is provided with a direction key 216, an analog stick 218, and four kinds of operation buttons 220. The direction key 216, the analog stick 218, and the operation button 220 are input units provided on a housing upper surface 222. The four kinds of buttons 224, 226, 228, and 230 are marked with different figures in different colors so as to distinguish one button from another. More specifically, a ○ button 224 is marked with a red circle, a x button 226 with a blue cross, a □ button 228 with a purple square, and a △ button 230 with a green triangle. Although the illustration is omitted, a housing rear surface 232 of the controller 202 is provided with a plurality of LEDs.

The user holds a left grip part 234b with his or her left hand and a right grip part 234a with his or her right hand so as to operate the controller 202. The direction key 216, the analog stick 218, and the operation buttons 220 are provided on the housing upper surface 222 so that the user can operate while holding the left grip part 234b and the right grip part 234a.

A button 236 with an LED is also provided on the housing upper surface 222. The button 236 with an LED is used, for example, so that the game console 200 displays a menu screen. The button 236 has a function of notifying the user of an incoming mail based on the light-emitting state of the LED or a function of indicating the charging state of the battery of the controller 202. For example, the LED is turned on in red while recharging and in green when the recharging is completed, and the LED is turned on to blink in red when the remaining battery is low.

For example, direction indicator keys indicating "up," "down," "left," and "right" directions are provided on the direction key 216. The direction indicator keys are operated by the user when moving a game character of a game, for example, from right to left or up and down on a screen, when moving a character input cursor from right to left or up and down on an email compose screen, when scrolling a page while browsing a Web page, or when moving a cursor from right to left or up and down on an email compose screen. The direction indicator keys indicating "up," "down," "left," and "right" directions are used to indicate not only an up, down, left, or right direction but also an oblique direction. For example, the user can indicate, to the game console 200, a direction of diagonally upward toward right by concurrently pressing both the direction indicator key indicating "up" direction and the direction indicator key indicating "right" direction. The same applies to other direction indicator keys. For example, the user can indicate, to the game console 200, a direction of diagonally downward toward left by concurrently pressing both the direction indicator key indicating "down" direction and the direction indicator key indicating "left" direction.

Different functions are assigned to the respective operation buttons 220 by the application program. For example, a function of indicating display of a menu is assigned to the △ button 230, a function of indicating, for example, cancellation of a selected item is assigned to the x button 226, a function of indicating, for example, entry of the selected item is assigned to the ○ button 224, and a function of indicating, for example, display or non-display of a table of contents, etc., is assigned to the □ button 228.

The analog stick 218 is provided with: a rotary operator that allows for a tilting operation in any direction, having a rotating fulcrum of the operation shaft in the center; and a variable-analog-value output means for outputting a variable analog value according to the operation of the rotary operator. The rotary operator is provided at the tip of the operation shaft, which is provided such that an elastic member allows the operation shaft to return to its neutral position. The rotary operator keeps a position (a reference position) of being in an upright state (in a state of no tilting) when no tilting operation is performed by the user. The variable-analog-value output means is provided with a variable resistance element, etc. The resistance of the variable resistance element changes in accordance with the operation of the rotary operator. When the rotary operator of the analog stick 218 is operated to tilt, the controller 202 detects a coordinate value on an X-Y coordinate based on the amount of the inclination with respect to the reference position and to the direction of the inclination and transmits the coordinate value to the game console 200 as an operation output signal.

The controller 202 is provided with a select button 240, a start button 238, and the like. The start button 238 is for the user to give instructions so as to start a game, start displaying an email screen, or start or temporarily stop reproducing a movie or music. The select button 240 is for the user to give instructions so as to, for example, select the menu display on the television monitor 204.

The controller 202 is also provided with a vibration generating mechanism in the right grip part 234a and the left grip part 234b. For example, the vibration generating mechanism is provided with a weight, which is in a state of being eccentric with respect to the rotation shaft of a motor, and vibrates the controller 202 by rotating the weight by the motor. The vibration generating mechanism operates in accordance with an instruction from the game console 200. The controller 202 transmits the vibration to the user's hands by operating the vibration generating mechanism.

[Internal Configuration of the Game Console]

A detailed description will be made regarding the internal circuit configuration of the game console 200. The game console 200 is provided, as the basic components thereof, with a main CPU 300, a GPU (graphic processor unit) 302, an input/output processor 304, an optical disk reproducing unit 306, main memory 308, a masked ROM 310, and a sound processor 312. The main CPU 300 processes a signal or controls an internal constitution component based on various types of programs such as an application for a game, an email, or a Web browser. The GPU 302 performs an image process. The input/output processor 304 performs an interface process between the outside and the inside of the apparatus or a process for maintaining backward compatibility. The optical disk reproducing unit 306 reproduces an optical disk such as a BD, a DVD, or a CD, in which an application program or multimedia data is recorded. The main memory 308 functions as a buffer that temporarily stores data loaded from a work area of the main CPU 300 or from an optical disk. The masked ROM 310 mainly stores an operating system program that is executed by the main CPU 300 or the input/output processor 304. The sound processor 312 processes an audio signal.

The game console 200 also has a CD/DVD/BD processor 314, an optical disk reproduction driver 316, a mecha controller 318, a hard disk drive 334, and a card-type connector (e.g., a PC card slot) 320. The CD/DVD/BD processor 314 reproduces (or restores) data recorded in a CD/DVD/BD by performing, for example, an error correcting process (e.g., a CIRC (Cross Interleave Reed-Solomon Coding) process), a decompression/decoding process, or the like on a disk reproduction signal, which is loaded from the CD/DVD/BD by the optical disk reproducing unit 306 and then amplified by an RF amplifier 328. The optical disk reproduction driver 316 and the mecha controller 318 perform rotation control of a spindle motor of the optical disk reproducing unit 306, focus/tracking control of optical pickup, loading control of a disk tray, and the like.

For example, the hard disk drive 334 stores save data of the application program or game loaded by the optical disk reproducing unit 306 or stores data or the like of a picture, a moving image, music, etc., acquired via the input/output processor 304. The card-type connector 320 is, for example, a connection port for a communication card or an external hard disk drive, etc.

These components are mutually connected to one another mainly via bus lines 322 and 324 or the like. The main CPU 300 and the GPU 302 are connected via dedicated bus. The main CPU 300 and the input/output processor 304 are connected via SBUS. The input/output processor 304, the CD/DVD/BD processor 314, the masked ROM 310, the sound processor 312, the card-type connector 320, and the hard disk drive 334 are connected via SSBUS.

The main CPU 300 controls all operations of the game console 200 by executing an operating system program for the main CPU that is stored in the masked ROM 310. The main CPU 300 is loaded from an optical disk such as a CD, a DVD, or a BD and loaded into the main memory 308. The main CPU 300 executes various types of application programs, etc., that are downloaded via a communication network and controls the operation of, for example, executing a game, and composing and editing an email, browsing a Web page.

The input/output processor 304 controls the input and output of data, etc., from the memory card 326 that stores a signal or a setting of a game provided from the controller 202 in accordance with the operation by the user, the content or the address of an email, the URL of a Web site, etc., by executing an operating system program for the input/output processor that is stored in the masked ROM 310. In addition, the input/output processor 304 also controls the input and output of data via a USB connecting terminal 208, Ethernet (e.g., a network card) 330, an IEEE1394 terminal (not shown), a PC card slot (not shown), or the like. The input/output processor 304 also inputs and outputs data to the memory card 326 via the PC card slot (not shown). The exchange of information from the controller 202 or the memory card is performed via an interface 332 including a multimedia slot and a wireless transmission and reception port.

The GPU 302 has a function of a geometry transfer engine for a process of coordinate transformation or the like and a function of a rendering processor, performs rendering in accordance with a rendering instruction from the main CPU 300, and stores a rendered image in a frame buffer (not shown). In other words, for example, when the various types of application programs recorded in an optical disk use so-called three dimensional (3D) graphics as in a game, the GPU 302 calculates the coordinate, etc., of a polygon for forming a three-dimensional object by a geometric calculation. Further, the GPU 302 performs a calculation for generating an image obtained by capturing the three-dimensional object by a virtual camera, in other words, performs a calculation of perspective transformation (a calculation of coordinate values when vertices of each polygon forming the three-dimensional object are projected on a virtual camera screen) by a rendering process. The image data, which is finally obtained, is written to a frame buffer. The GPU 302 then outputs a video signal corresponding to the generated image.

The sound processor 312 is provided with an ADPCM (Adaptive Differential Pulse Code Modulation) decoding function, an audio signal reproduction function, a signal modulation function, and the like. The ADPCM decoding function is a function of reproducing and then outputting an audio signal of a sound effect, etc., by loading waveform data stored in a sound buffer (not shown) that is built in or externally attached to the sound processor 312. The signal modulation function operates also as so-called sampling sound source that generates an audio signal of a music sound, a sound effect, etc., from the waveform data stored in the sound buffer.

In the game console 200 having a configuration such as the one described above, for example, when the power is turned on, the operating system programs for the main CPU 300 and for the input/output processor 304 is loaded from the masked ROM 310. The main CPU 300 and the input/output processor 304 execute the respective operating system programs. This allows the main CPU 300 to control the components of the game console 200 in an integrated manner. The input/output processor 304 controls the input and output of a signal between the controller 202 and the memory card 326, etc. The main CPU 300 first performs, when executing the operating system program, an initializing process such as an operation check. The main CPU 300 then controls the optical disk reproducing unit 306 so as to load an application program such as a game that is recorded in the optical disk and then executes the game application program after loading the application program into the main memory 308. In accordance with the user's instruction received from the controller 202 via the input/output processor 304 by the execution of the game application program, the main CPU 300 controls the GPU 302 and the sound processor 312 so as to control the display of an image and the generation of a sound effect and a music sound.

When reproducing a movie or the like recorded in the optical disk, the main CPU 300 controls, in accordance with the user's instruction (command) received from the controller 202 via the input/output processor 304, the GPU 302 and the sound processor 312 so as to control the display of the video image and the generation of the sound effect and the music sound of the movie reproduced from the optical disk.

When data needs to be transmitted to an external apparatus, the main CPU 300 transmits the data to communication network 18 via the input/output processor 304 and the Ethernet (e.g., a network card) 330. The main CPU 300 receives the data transmitted from the external apparatus via the Ethernet 330 and the input/output processor 304 and appropriately processes the data.

Figure 9:
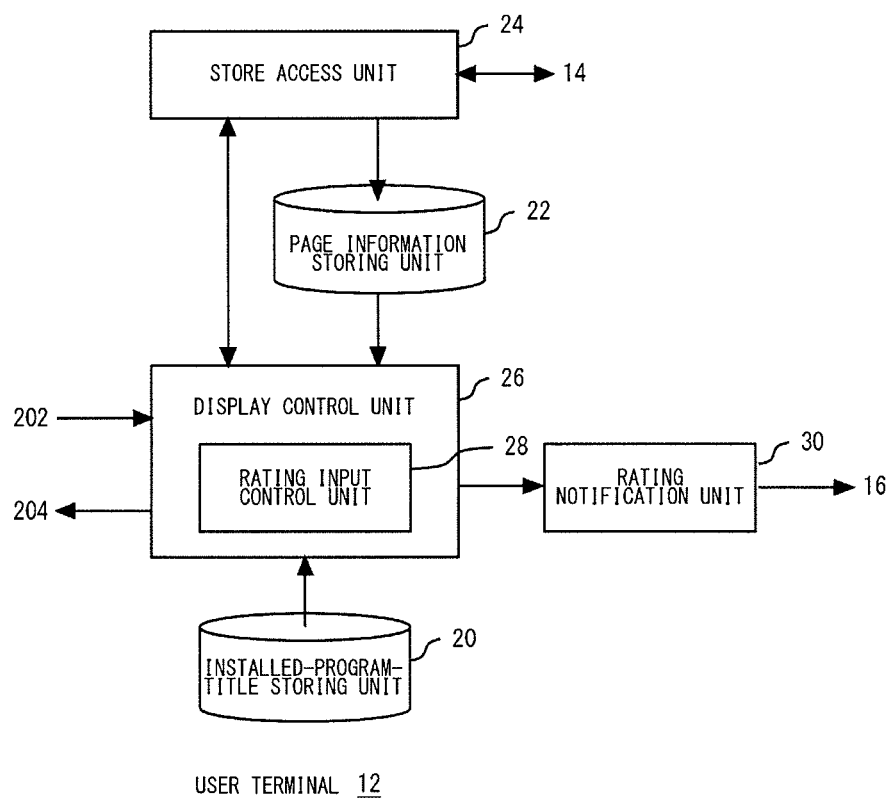
FIG. 9 is a block diagram illustrating a functional configuration of the user terminal shown in FIG. 1.

FIG. 9 is a block diagram illustrating a functional configuration of the user terminal 12 shown in FIG. 1. The user terminal 12 is provided with an installed-program-title storing unit 20 and a page information storing unit 22 as storage areas in which various data is stored. The user terminal 12 is further provided with a store access unit 24, a display control unit 26, and a rating notification unit 30 as data processing blocks that perform various types of data processes. The display control unit 26 includes a rating input control unit 28.

The blocks shown in the block diagram of the specification are implemented in the hardware by any CPU, memory, or HDD of a computer, other elements, electronic circuits, or mechanical devices, and in software by a computer program or the like. The block diagram depicts functional blocks implemented by the cooperation of hardware and software. Thus, a person skilled in the art should appreciate that there are many ways of accomplishing these functional blocks in various forms in accordance with the components of hardware, software, or the combination of both. For example, as program modules, the functional blocks shown in FIG. 9 may be stored in removable recording media and installed in a hard disk drive 334. The data processing blocks of FIG. 9 may be appropriately loaded in memory 308 and executed by the CPU 300 or the GPU 302.

The installed-program-title storing unit 20 stores information (hereinafter, also referred to as "installed-content information") related to the content installed in the user terminal 12. The installed-content information contains information that indicates whether or not the introduced content is content (hereinafter, also referred to as "content allowing for rating") that allows for rating input by the user. The page information storing unit 22 temporarily stored the data of a store page. The store page is written in an XML and appropriately contains image data of a thumbnail image, etc.

The store access unit 24 transmits an acquisition request for the store page to the store server 14 in accordance with the instruction of the display control unit 26, acquires the data of the store page from the store server 14, and stores the data in the page information storing unit 22. The store access unit 24 specifies the ID of the user in the case of an acquisition request for the front page 100, the ID of the category in the case of an acquisition request for the category page 102, and the ID (title ID and sales unit ID, which will be described hereinafter) of the detail display content in the case of an acquisition request for the content detail page 104.

When acquiring the data of the category page 102, the store access unit 24 also acquires the content detail page 104 of a plurality of pieces of content that belong to the category. The store access unit 24 then stores the data of the content detail page 104 in the page information storing unit 22 along with the data of the category page 102. The store access unit 24 also transmits a purchase request for content in accordance with the instruction of the display control unit 26.

The display control unit 26 transmits display data to the television monitor 204 so as to control the display of the store page on the television monitor 204. The display control unit 26 also receives the operation by a user's operation on the store page and then performs a process corresponding to the operation content.

More specifically, in accordance with the user's operation on the controller 202, the display control unit 26 transmits to the television monitor 204 the store page stored in the page information storing unit 22 so that the store page is displayed. For example, when specific content is selected and the ○ button 224 is pressed while the category page 102 is being displayed, the content detail page 104 of the selected content is displayed. When the store page specified by the user is not stored in the page information storing unit 22, the display control unit 26 instructs the store access unit 24 to acquire the store page. When the user performs a purchase operation on the content detail page 104, the display control unit 26 instructs the store access unit 24 to transmit a purchase request for purchasing the content.

When the rating icon 128 is selected on the content detail page 104, the rating input control unit 28 determines, in reference to the installed-content information of the installed-program-title storing unit 20, whether or not the content to be rated is already installed and whether or not the content to be rated is the content allowing for rating. When the content to be rated is already installed and is the content allowing for rating, the rating input control unit 28 displays the rating entry screen 134 on the television monitor 204. More specifically, the rating input control unit 28 displays the rating entry screen 134 such that the rating entry screen 134 is superimposed on the content detail page 104 in a pop-up manner. When the content to be rated is not yet installed or is not the content allowing for rating, the rating input control unit 28 displays on the television monitor 204 a message indicating that the content cannot be rated.

Upon the detection of an entry operation on the rating entry screen 134, the rating input control unit 28 transmits to the rating notification unit 30 the ID (title ID and sales unit ID, which will be described hereinafter) of the content rated by the user and the rating value input by the user. The rating notification unit 30 transmits the data to the rating server 16.

Figure 10:
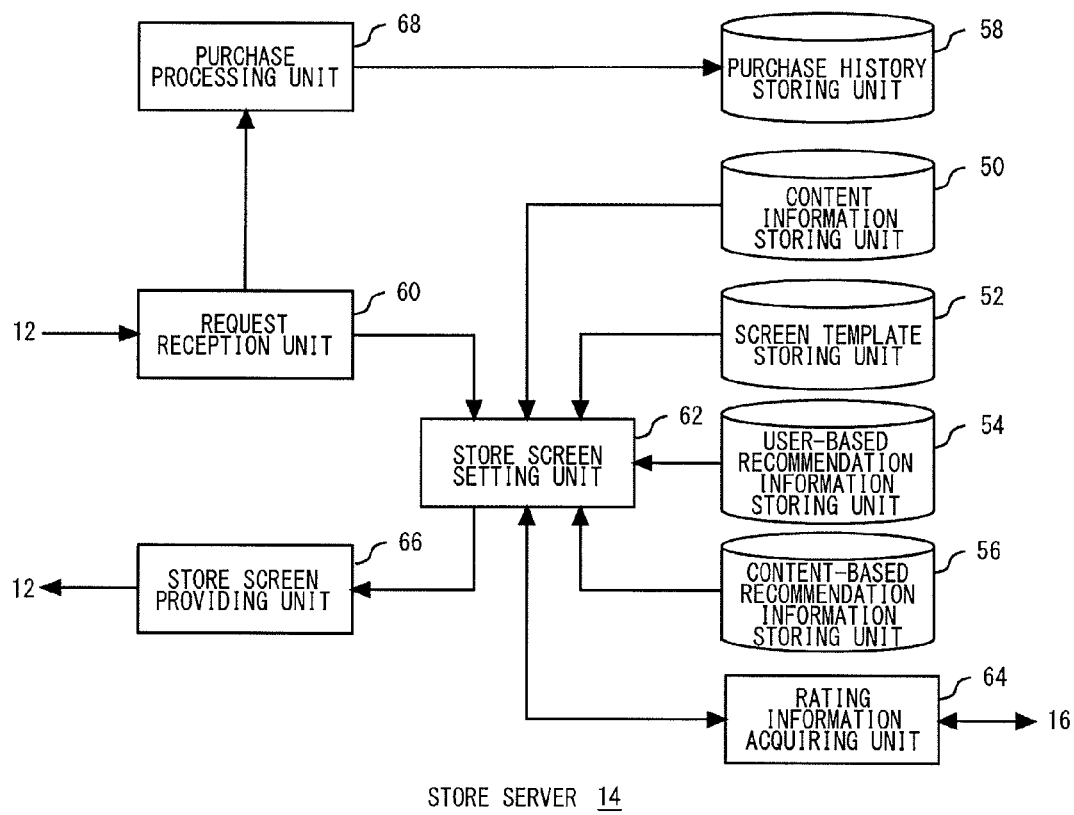
FIG. 10 is a block diagram illustrating a functional configuration of a store server in FIG. 1.

FIG. 10 is a block diagram illustrating a functional configuration of the store server 14 in FIG. 1. The store server 14 is provided with a content information storing unit 50, a screen template storing unit 52, a user-based recommendation information storing unit 54, a content-based recommendation information storing unit 56, and a purchase history storing unit 58 as storage areas in which various data is stored. The store server 14 is also provided with a request reception unit 60, a store screen setting unit 62, a rating information acquiring unit 64, a store screen providing unit 66, and a purchase processing unit 68 as data processing blocks. As program modules, the functional blocks shown in the figure may be stored in removable recording media and installed in the hard disk of the store server 14. The data processing blocks may be appropriately loaded in the main memory of the store server 14 and executed by the CPU.

The content information storing unit 50 stores information related to various types of content to be purchased in a store site. In the present embodiment, single piece of content is managed based on three types of management. A first type of management is management based on a provider (e.g., a sales company of a game or a movie) of the content. A second type of management is management based on a title (in other words, a product). A third type of management is management based on a sales mode of the content or based on reproduction detail of the content (hereinafter, generically referred to as a management "based on a sales unit"). The size of granularity of these types of management is as follows:

the management based on a provider>the management based on a title>the management based on a sales unit More specifically, the content information storing unit stores, as content information, a provider ID, which is an ID per a provider, a title ID, which is an ID per a title, a sales unit ID, which is an ID per a sales unit, a provider name, a title name, sales unit information, price, a thumbnail image, and other meta information (a genre, series, etc.).

The screen template storing unit 52 stores templates of various types of store pages. In the present embodiment, the screen template storing unit 52 stores, as a template of the front page 100, the details of the recommendation information area 114, that is, the page data in which no set recommended content or the rating value thereof. The screen template storing unit 52 also stores, as a template of the category page 102, the page data in which no rating value of the content field is set. The template of the category page 102 is associated with the ID of each category and stored on a category-by-category basis.

The screen template storing unit 52 stores, as a template of the content detail page 104, the page data in which no rating value of the detail information area 126, that is, no rating value of the detail display content, or no details of the recommendation information area 130 is set. The template of the content detail page 104 is associated with the title ID and the sales unit ID of the content and stored on a sales unit-by-sales unit basis.

The user-based recommendation information storing unit 54 associates, with the ID of each user, and stores user-based recommendation information indicating content to be recommended for each user, which is determined based on an attribute concerning the user. The user-based recommendation information may be the information of the content belonging to a genre that is same as or similar to that of the content the user purchased in the past or the information of the content belonging to the same series. A recommendation information determination unit (not shown) may refer to the history information of the content each user purchased in the past so as to update, as needed, the user-based recommendation information regarding the user and so as to store the user-based recommendation information in the user-based recommendation information storing unit 54.

The content-based recommendation information storing unit 56 associates, with the ID of each content, and stores content-based recommendation information indicating other content to be recommended based on content, which is determined based on an attribute concerning the content. The content-based recommendation information on given content may be the information of the content belonging to a genre that is same as or similar to that of the content or the information of the content belonging to the same series. The recommendation information determination unit (not shown) may refer to the meta information of respective content so as to update, as needed, the content-based recommendation information regarding the content and so as to store the content-based recommendation information in the content-based recommendation information storing unit 56.

The purchase history storing unit 58 stores history information of the content the user purchased in the past. As described above, the history information is appropriately referred to when determining the user-based recommendation information.

The request reception unit 60 receives, from the user terminal 12, an acquisition request for the store page and a purchase request for the content. The request reception unit 60 performs user authentication when accessed from the user terminal 12 for the first time. When the authentication succeeds, the request reception unit 60 allows the store screen setting unit 62 to perform a setting process of a store page. When the authentication fails, the request reception unit 60 indicates to the user terminal 12 that the provision of the store page is rejected.

When the request reception unit 60 receives the acquisition request for the store page, the store screen setting unit 62 sets the data of the requested store page. When the front page 100 is requested, the store screen setting unit 62 refers to the user-based recommendation information so as to identify recommended content for the access user. The store screen setting unit 62 then acquires the thumbnail image, the title name, etc., of the recommended content from the content information storing unit 50 and adds them to the template of the front page 100. The store screen setting unit 62 also acquires the rating value of the recommended content from the rating server 16 via the rating information acquiring unit 64 and adds the rating value to the template of the front page 100.

When the category page 102 is requested, the store screen setting unit 62 acquires the template of the category page 102 of the requested category and specifies the content (hereinafter, also referred to as "content within the category") that belongs to the category that is set in the template. The store screen setting unit 62 then acquires the rating value of the content within the category from the rating server 16 via the rating information acquiring unit 64 and adds the rating value to the template of the category page 102. The title ID and the sales unit ID of the content within the category are set in the category page 102.

When the content detail page 104 is requested, the store screen setting unit 62 refers to the content-based recommendation information so as to identify recommended content that corresponds to the detail display content. The store screen setting unit 62 then acquires the thumbnail image, the title name, etc., of the recommended content from the content information storing unit 50 and adds them to the template of the content detail page 104. The store screen setting unit 62 also acquires the rating value of the detail display content and the rating value of the recommended content from the rating server 16 via the rating information acquiring unit 64 and adds the rating values to the template of the content detail page 104. The title ID and the sales unit ID of the detail display content are set in the content detail page 104.

The rating information acquiring unit 64 acquires from the rating server 16 the rating value of the content specified by the store screen setting unit 62. The rating information acquiring unit 64 specifies the title ID and the sales unit ID of the content when making the acquisition request of the rating value to the rating server 16. The store screen providing unit 66 transmits the data of the store page set by the store screen setting unit 62 to the user terminal 12. The store screen setting unit 62 and the store screen providing unit 66 provide the store page to the user terminal 12 so that the store page displayed on the user terminal 12 transitions in accordance with the embodiment of screen transition shown in FIG. 2.

When the category page 102 is requested, the store screen setting unit 62 sets the data of the content detail page 104 regarding the content within the category in parallel with the data of the category page 102. As a response to the acquisition request for the category page 102, the store screen providing unit 66 transmits the data of the category page 102 and the data of the content detail page 104 to the user terminal 12 all at once.

When the request reception unit 60 receives the purchase request for the content, the purchase processing unit 68 performs various types of processes required for the sales of the content. For example, the purchase processing unit 68 performs a payment process for the payment by a credit card, etc., a provision process of content for the provision by downloading, etc., and a license management process. The purchase processing unit 68 adds the information on the content purchased by the user to the purchase history storing unit 58 and updates the purchase history of the user.

Figure 11:
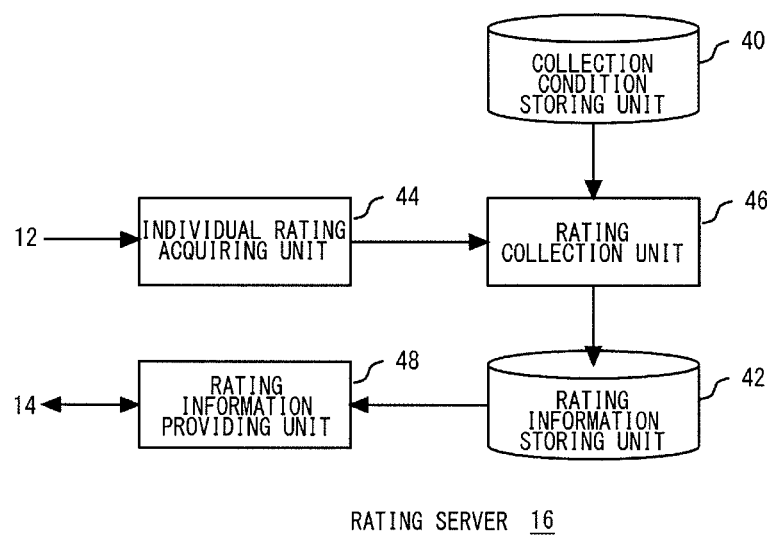
FIG. 11 is a block diagram illustrating a functional configuration of a rating server shown in FIG. 1.

FIG. 11 is a block diagram illustrating a functional configuration of the rating server 16 shown in FIG. 1. The rating server 16 is provided with a collection condition storing unit 40 and a rating information storing unit 42 as storage areas in which various data is stored. The rating server 16 is also provided with an individual rating acquisition unit 44, a rating collection unit 46, and a rating information providing unit 48 as data processing blocks. As program modules, the functional blocks shown in the figure may be stored in removable recording media and installed in the hard disk of the rating server 16. The data processing blocks may be appropriately loaded in the main memory of the rating server 16 and executed by the CPU.

The collection condition storing unit 40 stores a collection condition indicating a unit (range) for collecting the rating value (hereinafter, also referred to as an "individual rating value") given by each user on the content. In the present embodiment, the title of the content is basically the collection unit. Therefore, the rating value given by each user is collected for any content having an identical title, regardless of differences and similarities in the sales mode and the reproduction detail, that is, regardless of differences and similarities in the sales unit, so as to compute a finally obtained rating value (hereinafter, also referred to as a "final rating value") of the content.

As an exception, for content (hereinafter, also referred to as "special content") that has a plurality of different types of reproduction detail where each of the plurality of different types of reproduction detail is assumed to be based on a different standard the rating of the user, each different reproduction detail is used as the collection unit. Special content typically contains a movie or drama where one type of the reproduction detail is a two-dimensional (2D) video image and the other type of the reproduction detail is three-dimensional (3D) video image. This is because the story of the content can be used as the main standard of the rating of the user in the case of the 2D video image and the visual impact can be used as the main standard of the rating of the user in the case of the 3D video image. As another example, a movie or a game is contained where one type of the reproduction detail is a normal version and the other type of the reproduction detail is a special version including additional details (a video image, a character, a stage, etc.). This is because the additional content added to the special version can be used as the main standard of the rating.

For example, in the category page 102 shown in FIG. 4, the 3D version and the 2D version are shown to be different collection units for a movie "AAA," and a different rating value is presented for each version. The SD version and the HD version are shown to be same collection units for a movie "BBB," and same rating values are presented for both versions. The rental and the purchase modes are shown to be same collection units for a drama "23," and same rating values are presented for both modes. The special version and the normal version are shown to be different collection units for a game "○○ golf," and a different rating value is presented for each version.

The collection condition storing unit 40 stores, as the collection condition, the title ID and the sales unit ID of the content to be collected based on a sale unit. The rating information storing unit 42 associates a final rating value obtained based on a title with the title ID of the content and with the number of users who rated the content and then stores the final rating value. The rating information storing unit 42 also associates a final rating value obtained based on a sales unit with the title ID and the sales unit ID of the content and with the number of users who rated the content and then stores the final rating value.

The individual rating acquisition unit 44 acquires from the user terminal 12 the title ID, the sales unit ID, and the individual rating value of the content. The rating collection unit 46 refers to the collection condition so as to specify whether a combination of the title ID and the sales unit ID is to be collected based on a sales unit or based on a title. When the combination is to be collected based on a sale unit, the individual rating value is incorporated in the final rating value of the rating information storing unit 42 that corresponds to the combination of the title ID and the sale unit ID. For example, the average value of individual rating values given by respective users may be updated, and the average value as updated may be determined to be a new final rating value. When the combination is to be collected based on a title, the individual rating value is incorporated in the final rating value of the rating information storing unit 42 that corresponds to the title ID.

Upon the receipt of the acquisition request for the rating value of the content from the store server 14, the rating information providing unit 48 acquires the requested rating value from the rating information storing unit 42 and provides the rating value to the store server 14. More specifically, when the combination of the title ID and the sales unit ID specified by the acquisition request is associated with the final rating value, the rating information providing unit 48 provides the final rating value obtained based on a sales unit. When there is no rating value that corresponds to the combination of the title ID and the sales unit ID, the rating information providing unit 48 provides the final rating value, which is associated with the title ID, obtained based on a title. As an exemplary variation, upon the receipt of the acquisition request for the rating value of the content from the user terminal 12, the rating information providing unit 48 may provide the requested rating value to the user terminal 12.

An explanation is given of the operation of the above configuration in the following.

Figure 12:
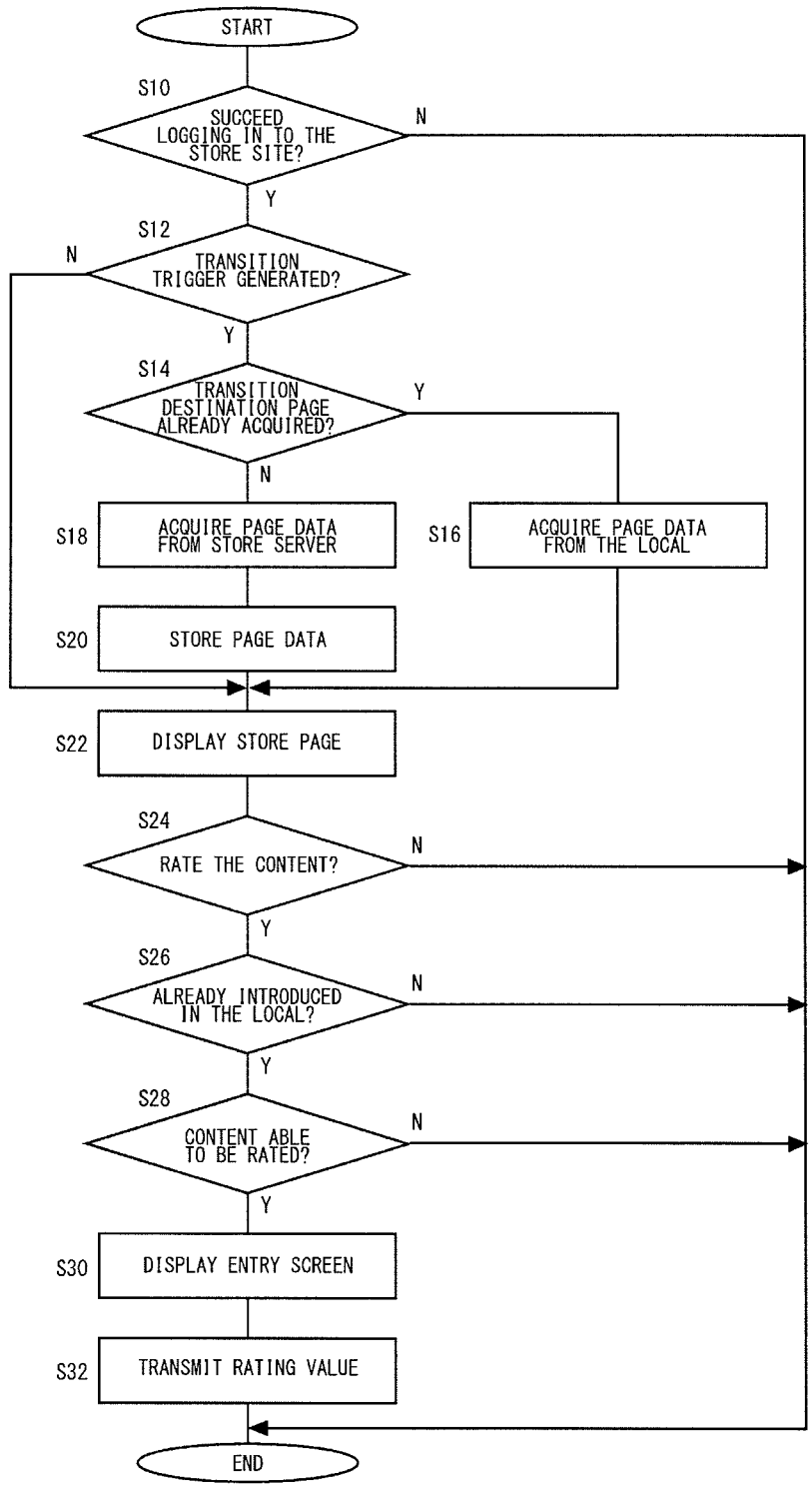
FIG. 12 is a flowchart illustrating the operation of the user terminal.

FIG. 12 is a flowchart illustrating the operation of the user terminal 12. The flowchart of the present specification displays the processing sequence of components by a combination of a letter "S" (the initial of the word "Step"), which represents a step, and a number. When some sort of a determination process is performed by a process displayed by the combination of a letter "S" and a number, the processing sequence is displayed while adding a letter "Y" (the initial of the word "Yes") when the determination result is positive (e.g., Y in S10) and is displayed while adding a letter "N" (the initial of the word "No") when the determination result is negative (e.g., N in S10).

When the log in to the store site of the content succeeds (Y in S10), and when a transition trigger of the store page is generated, more specifically, when a push of the ○ button 224 or the x button 226 is detected (Y in S12), the display control unit 26 checks whether or not the store page of the transition destination is already stored in the page information storing unit 22. When the store page is not stored (N in S14), the store access unit 24 acquires the store page from the server 14 (S18) and stores the store page in the page information storing unit 22 (S20). The display control unit 26 displays the store page acquired by the store access unit 24 on the television monitor 204 (S22). When the store page of the transition destination is stored in the page information storing unit 22 (Y in S14), the display control unit 26 acquires the store page (S16) and displays the store page on the television monitor 204 (S22). When the transition trigger of the store page is not generated (N in S12), the steps S14 through S20 are skipped, and the original store page is continuously displayed.

When a rating icon is selected in the content detail page 104 (Y in S24), and when the content to be rated is already installed in the local (Y in S26) and is content allowing for rating (Y in S28), the rating input control unit 28 displays an entry screen for a rating value (S30). When the user operates to complete the entry of the rating value, the rating notification unit 30 transmits the entered rating value to the rating server 16 (S32). When the rating icon is not selected (N in S24), and when the content to be rated is not installed (N in S26) and is prohibiting rating (N in S28), the steps S30 and S32 are skipped. When the log in to the store site of the content fails (N in S10), the steps S12 through S32 are skipped and the flow in the figure is ended.

Figure 13:
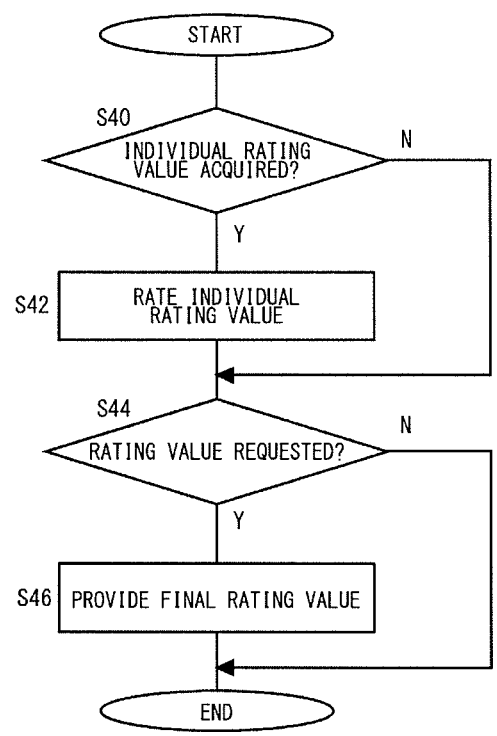
FIG. 13 is a flowchart illustrating the operation of the rating server.

FIG. 13 is a flowchart illustrating the operation of the rating server 16. When the individual rating acquisition unit 44 acquires an individual rating value of the content from the user terminal 12 (Y in S40), the rating collection unit 46 collects the individual rating value in accordance with a collection condition and computes a final rating value of the content obtained based on a tile or based on a sales unit (S42). When the individual rating acquisition unit 44 does not acquire the individual rating value of the content (N in S40), the step S42 is skipped. When receiving an acquisition request for rating information of the content from the store server 14 (Y in S44), the rating information providing unit 48 provides to the store server 14 the final rating value of the content, which is specified by the acquisition request, obtained based on a tile or based on a sales unit (S46). When the acquisition request for rating information is not received (N in S44), the step S46 is skipped.

FIG. 14 is a flowchart illustrating the operation of the store server 14. When receiving an acquisition request for a store page from the user terminal 12 (Y in S50), the request reception unit 60 performs a setting process of the store page user the condition that user authentication succeeds (Y in S52). When the front page 100 is requested (Y in S54), the store screen setting unit 62 identifies recommended content corresponding to the access user (S56) in reference to user-based recommendation information so as to acquire the rating value of respective recommended content from the rating server 16 (S58). The store screen setting unit 62 sets the data of the front page 100 by setting the recommended content and the rating value thereof in the template of the front page 100. The store screen providing unit 66 provides the data of the front page 100 to the user terminal 12 (S60). When the front page is not requested (N in S54), the step S60 is skipped.

When the category page 102 is requested (Y in S62), the store screen setting unit 62 acquires from the rating server 16 rating values of a plurality of pieces of content (hereinafter, also referred to as "content within the category") that belong to the category (S64). The store screen setting unit 62 then sets the data of the category page 102 by setting the rating value of the content within the category in the template of the category page 102 (S66). The store screen setting unit 62 identifies recommended content corresponding to the content within the category (S68) in reference to content-based recommendation information so as to acquire the rating value of respective recommended content from the rating server 16 (S70). The store screen setting unit 62 then sets the data of the content detail page 104 by setting the recommended content and the rating value thereof in the template of the content detail page 104 of the content within the category (S72). The store screen providing unit 66 provides both the data of the category page 102 and the data of the content detail page 104, which are set by the store screen setting unit 62, to the user terminal 12 all at once (S74).

When the content detail page 104 is requested (N in S62), the store screen setting unit 62 identifies recommended content corresponding to the detail display content (S68) in reference to content-based recommendation information so as to acquire the rating value of the respective recommended content from the rating server 16 (S70). The store screen setting unit 62 then sets the data of the content detail page 104 by setting the recommended content and the rating value thereof in the template of the content detail page 104 of the detail display content (S72). The store screen providing unit 66 provides the data of the content detail page 104, which is set by the store screen setting unit 62, to the user terminal 12 (S74). When the acquisition request for the store page is not received (N in S50) or when the user authentication fails (N in S52), the step S54 and the subsequent steps are skipped, and the flow in the figure is ended.

The information providing system 10 of the present embodiment allows for a highly user-friendly store site to be realized for a user using the user terminal 12 in which information that can be easily input is limited due to, for example, a push of the ○ button 224 or the x button 226. More specifically, setting the store site to have about three hierarchical levels and traversing the hierarchical levels by a button operation facilitate the user to move within the store site.

For the user using the user terminal 12 in which information that can be easily input is limited, there are occasions when it is hard to find content that matches the user's preference among many pieces of content since content searches by keywords are difficult. Thus, the front page 100 presents recommended content based on the access user, and the content detail page 104 presents recommended content based on the detail display content. This allows many pieces of recommended content to be presented to the user in the store site, and a user's willingness to buy is more easily increased.

The information providing system 10 allows, when providing the category page 102 from the store server 14 to the rating server 16, the content detail page 104, which is on a lower level of the hierarchy, to be provided at the same time. This allows the content detail page 104 to be displayed without requiring the user terminal 12 to access the store server 14 when a screen transition from the category page 102 to the content detail page 104 occurs. Therefore, the screen transition is conducted in a short time without keeping the user waiting for a long time, and a highly user-friendly store site can be achieved.

The information providing system 10 allows an individual rating value given by the user to be collected, in principle, based on a title even when content having an identical title has a plurality of types of sales units (a sales mode or reproduction detail). This allows the individual rating value, which is given by the user to the content having the identical title, to be incorporated in a single rating value regardless of whether the sales unit is different or identical. Therefore, the parameter of an evaluator can be increased, and the reliability of the rating value can be improved. As an exception, when it is assumed that a standard of the rating used by the user is different since the reproduction detail is different, individual rating values of respective pieces of content each with different reproduction details are separately collected even when the pieces of content have an identical title, and a final rating value obtained based on a reproduction detail is provided. This allows both differences and similarities in the reproduction detail of the content and a proper value, which is obtained based on differences in standards of the rating caused due to the differences and the similarities, to be easily presented.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

In the above-stated embodiment, the rating input control unit 28 of the user terminal 12 displays the rating entry screen 134 in the content detail page 104 while the content detail page 104 acquired from the store server 14 is being displayed by the display control unit 26. As an exemplary variation, the display control unit 26 of the user terminal 12 may display profile information (e.g., a list screen of purchased content) of the user stored in the local or display download history information (e.g., a list screen of downloaded content). The rating input control unit 28 may display the rating entry screen 134 in these screens. As another exemplary variation, the rating input control unit 28 may detect the completion of content of, for example, a game and display the rating entry screen 134 in these screens (e.g., when displaying an end screen thereof). Needless to say, a program module allowing the rating input control unit 28 to operate in such a manner may be incorporated as data of the content, and the data may be loaded by the CPU of the user terminal 12 so as to be realized as the operation of the rating input control unit 28.

Optional combinations of the aforementioned embodiment and exemplary variations will also be within the scope of the present invention. New embodiments resulting from the combinations have combined effects of the embodiments and exemplary variations that are combined.

Therefore, it will be obvious to those skilled in the art that the function to be achieved by each constituent requirement described in the claims may be achieved by each constituting element shown in the embodiments and in the modifications or by a combination of the constituting elements.

What is claimed is:

1. An information providing apparatus adapted for a system where a plurality of types of content having identical title information may be sold in a plurality of sales modes, comprising:
    a storing unit configured to store identification information on special content having identical title information but having different production details so that it is assumed that a standard of rating by a user is different;
    a rating acquisition unit configured to acquire, from a terminal of a user who purchased one of the plurality of types of content, a title ID identifying title information of the purchased content, a sales unit ID identifying production details of the purchased content, and a rating for the purchased content;
    a rating collection unit configured to determine, by collecting users' rating acquired with the same title ID, the degree of rating for the plurality of types based on the title information, if the plurality of types of content are not special content, and, to determine, by collecting users' rating acquired with the same sales unit ID, the degree of rating for the plurality of types of content based on the production details, if the plurality of types of content are special content; and
    a rating information providing unit configured to provide, to an external apparatus, the degree of the user's rating for the plurality of types of content based on the title information, if the plurality of types of content are not special content, and to provide, to an external apparatus, the degree of the user's rating for the plurality of types of content based on the production details, if the plurality of types of content are special content.

2. The information providing apparatus according to claim 1, wherein the plurality of types of content having the identical title information include both content that is rented to the user for a predetermined period of time and content that is sold to the user, and
    the rating collection unit collects users' rating for the rented content and user's rating for the sold content and determines the same degree of rating for both of the content, if the plurality of types of content are not special content.

3. The information providing apparatus according to claim 1, wherein the special content includes a piece of content having identical title information that includes a two-dimensional image; and a piece of content having identical title information that includes a three-dimensional image.

4. An information providing method performed by a processor of an information providing apparatus and adapted for a system where a plurality of types of content having identical title information may be sold in a plurality of sales modes, the method comprising:
    acquiring, as input from an input device on a terminal of a user who purchased one of the plurality of types of content, a title ID identifying title information of the purchased content, a sales unit ID identifying production details of the purchased content, and a rating for the purchased content;
    determining, by the processor of the information providing apparatus, by collecting users' ratings acquired with the same title ID, the degree of rating for the plurality of types of content based on the title information, if it is determined that the plurality of types of content are not special content by referring to identification information of special content, and determining, by collecting users' rating acquired with the same sales unit ID, the degree of rating for the plurality of types of content based on the production details, if the plurality of types of content are special content, the special content having identical title information but having different production details so that it is assumed that a standard of rating by a user is different; and
    providing, by the processor of the information providing apparatus, to an external apparatus, the degree of the user's rating for the plurality of types of content based on the title information, if the plurality of types of content are not special content, and providing, to an external apparatus, the degree of the user's rating for the plurality of types of content based on the production details, if the plurality of types of content are special content.

5. A computer program product embedded on a non-transitory computer-readable medium, the computer program product being adapted for a system where a plurality of types of content having identical title information may be sold in a plurality of sales modes, and including modules implemented by an information-providing apparatus and comprising:

storing identification information on special content having identical title information but having different production details so that it is assumed that a standard of rating by a user is different;

acquiring, from a terminal of a user who purchased one of the plurality of types of content, a title ID identifying title information of the purchased content, a sales unit ID identifying production details of the purchased content, and a rating for the purchased content;

determining, by collecting users' rating acquired with the same title ID, the degree of rating for the plurality of types of content based on the title information, if the plurality of types of content are not special content, and determining, by collecting users' rating acquired with the same sales unit ID, the degree of rating for the plurality of types of content based on the production details, if the plurality of types of content are special content; and providing, to an external apparatus, the degree of the user's rating for the plurality of types of content based on the title information, if the plurality of types of content are not special content, and providing, to an external apparatus, the degree of the user's rating for the plurality of types of content based on the production details, if the plurality of types of content are special content.

\* \* \* \* \*